United States Patent [19]

Kikuchi et al.

[11] Patent Number: 4,720,624

[45] Date of Patent: Jan. 19, 1988

[54] NON-UNIFORM RESISTANCE HEATING TUBES

[75] Inventors: Akira Kikuchi, Tokai; Akira Tobita, Katsuta; Tetsuo Kobori, Mito; Ryosaku Shibayama, Fujioka, all of Japan

[73] Assignees: Doryokuro Kakunenryo Kaihatsu Jigyodan, Tokyo; Tokyo Seimitsuka Co., Ltd., Gunma, both of Japan

[21] Appl. No.: 634,295

[22] Filed: Jul. 25, 1984

[30] Foreign Application Priority Data

Sep. 20, 1983 [JP] Japan .................... 58-173871

[51] Int. Cl.⁴ .......................................... H01C 13/00
[52] U.S. Cl. .................... 219/553; 338/334; 376/333; 376/353
[58] Field of Search ........... 338/334; 219/300, 390, 219/553; 376/131, 148, 174, 353, 367, 405, 463, 333

[56] References Cited

U.S. PATENT DOCUMENTS

| | | |
|---|---|---|
| 3,851,150 | 11/1974 | Von Holzen .................. 219/553 |
| 4,297,562 | 10/1981 | Kamogawa et al. ........ 219/553 X |
| 4,345,142 | 8/1982 | Dietze .......................... 338/334 |

Primary Examiner—Harold Broome
Assistant Examiner—Marvin M. Lateef
Attorney, Agent, or Firm—Felfe & Lynch

[57] ABSTRACT

This is a non-uniform resistance heating tube constituting a simulated nuclear fuel cluster in a heat transfer test facility for nuclear reactor. This resistance heating tube has a fixed outside diameter and its thickness is molded so that an electric resistance distribution changes continuously corresponding to the power distribution state of nuclear fuel rod in the axial direction of the tube. This resistance heating tube can be obtained by drawing an original pipe, rolling it into an axially uniform thick, then grinding its outer surface so that its thickness becomes non-uniform continuously in the axial direction of the tube, and thereafter smoothing the outer surface of the tube by swaging so that its outside diameter becomes uniform.

5 Claims, 5 Drawing Figures

NON-UNIFORM RESISTANCE HEATING TUBES

BACKGROUND OF THE INVENTION (a) Field of the Invention

The present invention relates to resistance heating tubes constituting a simulated nuclear fuel cluster in a heat transfer test facility of a nuclear reactor and method of making same.

(b) Description of the Prior Art

In recent times, the nuclear reactors utilizing nuclear energy have been constructed in various countries, and consequently the ratio of the nuclear energy occupying in the total energy supply amount has been rising. These nuclear reactors, when an accident is brought about, exert a serious influence caused by radioactive contamination. Therefore, adequate consideration has been paid for safe operations of the nuclear reactors as well as the technicians in charge have carelessly devoted themselves to development of a nuclear reactor that is more safe and efficient in respect of maintenance and management. As a link in the series of investigations, it is necessary to measure a critical heat flux accurately beforehand in the manner of heating an original-sized simulated nuclear fuel electrically for the purpose of confirming that the heat caused by nuclear fission of nuclear fuel to be loaded on the nuclear reactor core may be removed completely. Usually, the heat transfer tests to measure the critical heat flux have been conducted by forming the electric resistance heating tubes like the nuclear fuel rods and using the simulated nuclear fuel cluster comprising several electric resistance heating tubes tied up in a bundle. However, as the resistance heating tubes constituting the conventional simulated nuclear fuel cluster are formed so as to have a uniform thickness or formed without taking into consideration the actual power distribution state of nuclear fuel rods, the power distribution state thereof is widely different from the actual power distribution state, and it has been regarded as a defect in the heat transfer test for effectively measuring the removal of heat from fuel rods with cooling water.

SUMMARY OF THE INVENTION

The object of the present invention is to provide resistance heating tubes that can realize a power distribution state being extremely similar to the axial power distribution of the nuclear fuel rod constituting the nuclear fuel cluster on the actual nuclear reactor core and method of making same.

According to the present invention, there can be provided non-uniform resistance heating tubes constituting the simulated nuclear fuel cluster within said tubes are uniform in outside diameter and the thickness of the tubes is molded so that an electric resistance distribution changes in the axial direction of tubes corresponding to the power distribution state of the nuclear fuel rod.

Such non-uniform resistance heating tubes are made by the following processing method. First, an original pipe is drawn out, this pipe is subjected to rolling into an axially uniform thick tube, and the outer face of this tube is subjected to grinding so that its thickness changes into the fixed thick distribution in the axial direction of the tube. Thereafter, the tube is subjected to swaging so that the tube outer face is uniform in outside diameter and the axial tube thickness distribution changes so as to indicate the electric resistance distribution corresponding to the fixed power distribution. Thus, there can be obtained a tube that has changed the electric resistance in the axial direction.

DETAILED DESCRIPTION OF THE INVENTION

The present invention will be explained with reference to the attached drawings hereinafter.

Figure 1:
FIG. 1 is a schematic sectional explanatory view illustrating one example of the resistance heating tube according to the present invention.
Figure 2:
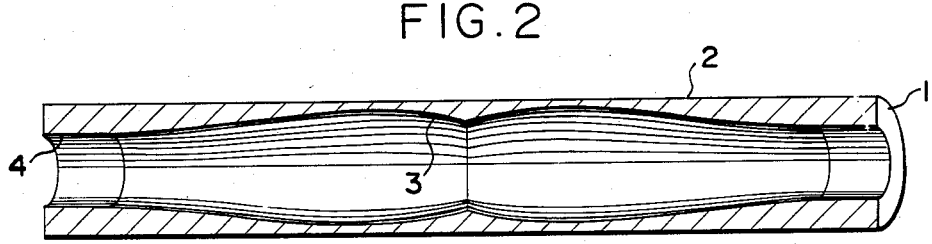
FIG. 2 is a schematic sectional explanatory view illustrating another example of the resistance heating tube according to the present invention.

In FIG. 1, a resistance heating tube 1 undergoes resistance heating, when an electric current is turned on, and is made of a metallic material such as stainless steel, Zircaloy, Inconel or the like. Its outside surface takes the form of a smooth face 2, and its inside surface takes the form of a non-uniform thick face 3 wherein the thickness decreases continuously from the vicinity of both end portions of said tube 1 toward substantially the central portion of the tube 1, the thinnest portion being formed almost at the central portion of the tube. In this connection, it is to be noted that uniform thick portions 4 at the both ends of the tube 1 are formed for brazing an electromaterial (electrode) used when an electric current is applied to the tube 1 and that such uniform thick portions 4 are preferable for the purpose of brazing the electromaterial but are not indispensable ones. Concerning the nuclear fuel cluster loaded on the nuclear reactor core, furthermore, it should not always be limited to an axial power distribution form that is symmetrical on the upper and lower sides with the center of length as a boundary line. In other words, said nuclear fuel cluster may be not symmetrical on the upper and lower sides but may take a double-peaked form or the like. FIG. 2 is a schematic sectional explanatory view illustrating the example of the resistance heating tube used in the heat transfer test of the cluster having such an axial power distribution form. That is, the resistance heating tube 1 illustrated in FIG. 2 is formed so that its outer peripheral surface takes the form of a smooth face 2 and the inner peripheral surface takes the form of a non-uniform thick face 3 wherein its thickness is reduced continuously from both ends of the tube 1 toward the inside thereof and is increased continuously toward substantially the central portion of the tube. Accordingly, this tube may be said to be molded so that the electric resistance of this tube may be minimal value at substantially the central portion and may become maximum on both sides adjacent thereto.

Figure 5:
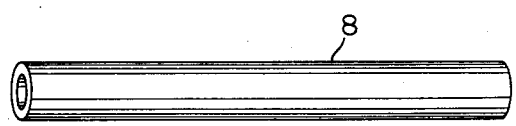
FIG. 5 is a schematic view illustrating a nuclear fuel rod.

The thickness of these resistance tubes 1 is formed to be non-uniform continuously in the axial direction of the tube, and as the thin portion has an electric resistance value greater than the thick portion, the non-uniform thickness distribution means a non-uniform electric resistance distribution. Accordingly, when an electric current is applied to said resistance heating tube 1, there is caused a power distribution corresponding to the electric resistance distribution of the tube. Thus, the axial power distribution of the actual fuel rod 8 (FIG. 5) can be re-generated without using the actual nuclear fuel rod by determining the electric resistance distribution of the tube, in other words the thickness distribution, taking into consideration the quality of resistance heating tube and the heating power source capacity corresponding to the axial power distribution state of the nuclear fuel rod used in the nuclear reactor to be investigated.

As described above, since the thickness of the resistance heating tube 1 according to the present invention is made non-uniform continuously in the axial direction of the tube so that its electric resistance distribution may be given corresponding to the axial power distribution state of the nuclear fuel rod of the nuclear reactor, the object for the heat transfer test, it is needless to say that the thickness distribution may be changed suitably so as to correspond with the power distribution state of the nuclear fuel rod and thus the electric resistance distribution can be changed.

Figure 3:
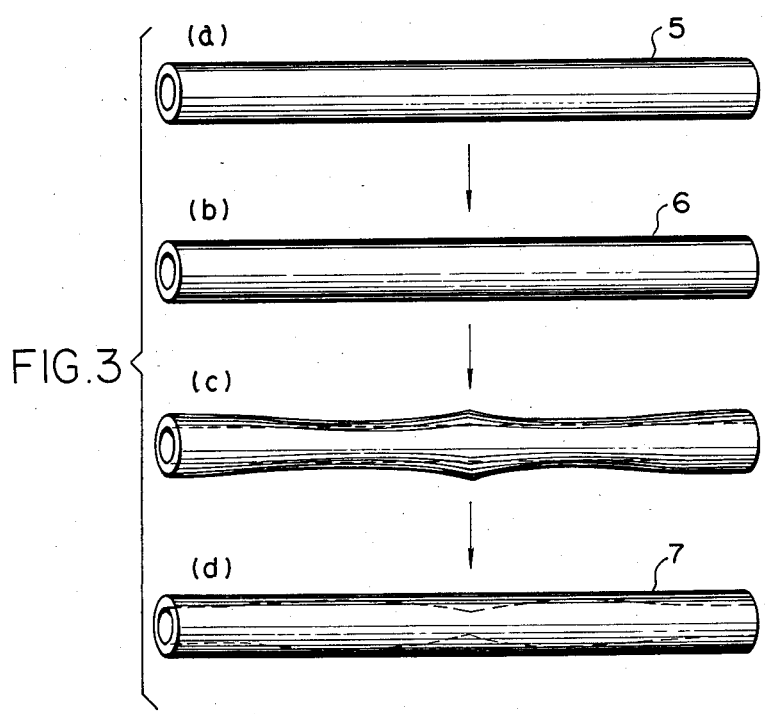
FIG. 3 is an explanatory view illustrating one example of the process of producing these resistance heating tubes.

Next, one example of making the above mentioned resistance heating tube will be shown as follows. That is, FIG. 3 is a view explaining one example of the manufacturing process, wherein an original pipe 5 made of a metallic material such as stainless steel, Zircaloy, Inconel or the like (a) is drawn out or extended by cold rolling into a fixed dimension and thickness for obtaining an uniform thick tube 6 (b), in succession this uniform thick tube 6 is subjected to grinding so that its outer face has a desired non-uniform thickness distribution which is continuous in the axial direction of the tube (c). The portions ground deeply by this outer face grinding come to form the thin portions. The tube, whose outer surface have been subjected to grinding, is thereafter subjected to swaging for smoothing the ground outer surfaces uniformly, whereby the non-uniform thick surfaces formed on the outer surface are themselves transferred to the inner surface of the tube. Thereafter, the outer surface of the tube is finished by grinding to thereby obtain a resistance heating tube 7 which has a desired electric resistance distribution and which is uniform in outside diameter and non-uniform in thickness (d).

The example of the present invention will be detailed with reference to the accompanying drawings hereinafter.

Figure 4:
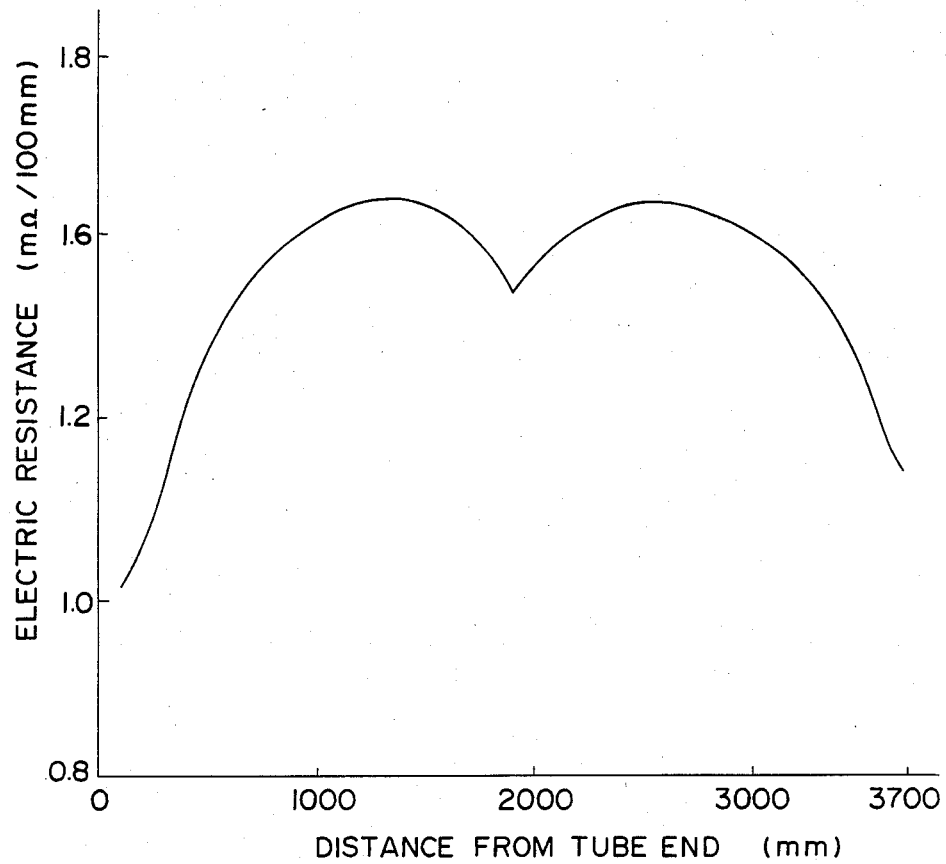
FIG. 4 is a view illustrating the electric resistance distribution of the resistance heating tube obtained according to one example of the method of the present invention.

As an original pipe there was prepared for a stainless steel pipe with a length of 6 m, an outside diameter of 60 mm and a thickness of 6 mm. This pipe was subjected to drawing and cold rolling and then cut in a length of 4.3 m to obtain an uniform thick tube with an outside diameter of 21 mm, and a thickness of 3.5 mm. In succession, the outer surface of the thus obtained uniform thick tube was ground into the configuration with the thick portions at both ends and the central portion of the tube as illustrated in FIG. 3(c). The tube at that time was made to have a length of 4.3 m, a maximum outside diameter of 21 mm, a minimum outside diameter of 15.4 mm, the most thick portion was 3.50 mm, and the thinnest portion was 0.7 mm. Then, the tube after grinding was subjected to swaging, and the outer surface of said tube was further ground to ultimately obtain a tube with a length of 3730 mm (wherein the electric resistance distribution length 3700 mm), an outside diameter of 14.5 mm, a most thick portion of 3.5 mm, and a thinnest portion of 0.7 mm. The electric resistance distribution of this tube is as shown in FIG. 4.

According to the present invention as mentioned above, the thickness of the resistance heating tube can be regulated so as to form the electric resistance distribution corresponding to the actual nuclear fuel rod, and so there can be obtained the resistance heating tube whose axial power distribution corresponds substantially to the actual nuclear fuel rod. By conducting the heat transfer test using the resistance heating tube like this, it is possible to reproduce substantially the exactly same axial power distribution of the actual nuclear reactor core. Therefore, it is safe to say that the present invention can practice an extremely accurate heat transfer test. In the case of the resistance heating tube like this, furthermore, its thickness distribution corresponding to a desired electric resistance distribution can be made by the swaging step after grinding of the outer surface of the tube, and therefore there can be readily produced the resistance heating tube that has a high accuracy, a uniform outside diameter, and a continuously changed thickness.

What is claimed is:

1. A simulated nuclear fuel cluster comprising:
    an elongated non-uniform resistance heating tube wherein said tube has a longitudinal axis and a uniform outside diameter and its thickness is molded so that an electric resistance distribution changes in the direction of the longitudinal axis of the tube corresponding to the power distribution state of a nuclear fuel rod.

2. A simulated nuclear fuel cluster according to claim 1 wherein said tube thickness is molded so that the electric resistance of the tube increases continuously from both end portions of the tube or the vicinity of both end portions of the tube toward the central portion of the tube and becomes maximum at the central portion of the tube or in the vicinity of the central portion of the tube.

3. A simulated nuclear fuel cluster according to claim 1 wherein said tube thickness is molded so that the electric resistance of the tube increases continuously from both end portions of the tube or the vicinity of both end portions of the tube toward the inside of the tube and decreases continuously toward substantially the central portion of the tube.

4. A simulated nuclear fuel cluster according to claim 3 wherein said tube thickness is molded so that the electric resistance of the tube has a value less than maximum at substantially the central portion of the tube and becomes maximum on both sides adjacent thereto.

5. A simulated nuclear fuel cluster according to claim 1 wherein said tube is made of any stainless steel, Zircaloy and Inconel.

* * * * *